United States Patent
Lochschmied et al.

(10) Patent No.: US 10,352,562 B2
(45) Date of Patent: *Jul. 16, 2019

(54) COMBUSTION DEVICE WITH A SIDE DUCT FOR MEASURING TURBULENT FLOWS

(71) Applicant: Siemens Aktiengesellschaft, Munich (DE)

(72) Inventors: Rainer Lochschmied, Rheinstetten-Forchheim (DE); Mike Schmanau, Malsch (DE); Bernd Schmiederer, Karlsruhe (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/722,246

(22) Filed: Oct. 2, 2017

(65) Prior Publication Data
US 2018/0094808 A1 Apr. 5, 2018

(30) Foreign Application Priority Data

Sep. 30, 2016 (EP) .................................... 16191977
Jun. 7, 2017 (EP) .................................... 17174747

(51) Int. Cl.
*F23N 1/02* (2006.01)
*F23D 14/60* (2006.01)
(Continued)

(52) U.S. Cl.
CPC ......... *F23N 1/022* (2013.01); *F04D 29/4213* (2013.01); *F04D 29/4226* (2013.01);
(Continued)

(58) Field of Classification Search
None
See application file for complete search history.

(56) References Cited

U.S. PATENT DOCUMENTS

| 6,939,127 B2 | 9/2005 | Goebel | ........................... 431/12 |
| 8,281,584 B2 | 10/2012 | Weber | ............................. 60/524 |

(Continued)

FOREIGN PATENT DOCUMENTS

| CN | 1509391 A | 6/2004 | ............ F04D 29/42 |
| CN | 101253366 A | 8/2008 | ................ F02C 3/30 |

(Continued)

OTHER PUBLICATIONS

U.S. Non-Final Office Action, U.S. Appl. No. 15/722,192, 13 pages, dated Sep. 5, 2018.

(Continued)

*Primary Examiner* — Harshad R Patel
(74) *Attorney, Agent, or Firm* — Slayden Grubert Beard PLLC (57) ABSTRACT

The present disclosure deals with the measurement of flows of a fluid in a combustion device. In particular embodiments, the teachings may be employed in the measurement of flows of fluids such as air in the presence of turbulence. For example, a combustion device may include: a burner; a side duct; and a feed duct. The side duct may include a mass flow sensor and a flow resistance element. The mass flow sensor detects a mass flow through the side duct. The flow resistance element subdivides the side duct. A connector of the feed duct comprises a Pitot probe. A first section of the Pitot probe projects into the feed duct and a sub area facing towards the outlet of the feed duct of the first section of the Pitot probe comprises the inlet of the Pitot probe.

13 Claims, 5 Drawing Sheets

(51) Int. Cl.
  *F23N 5/18* (2006.01)
  *F04D 29/42* (2006.01)
  *G05D 11/13* (2006.01)
(52) U.S. Cl.
  CPC .............. *F23D 14/60* (2013.01); *F23N 5/184* (2013.01); *G05D 11/13* (2013.01); *F23N 2005/181* (2013.01); *F23N 2033/08* (2013.01)

(56) References Cited

U.S. PATENT DOCUMENTS

| | | | |
|---|---|---|---|
| 9,677,765 B2 | 6/2017 | Metz et al. | |
| 2009/0249793 A1 | 10/2009 | Nilsson et al. | 60/780 |
| 2013/0045077 A1 | 2/2013 | Metz et al. | 415/1 |
| 2013/0302738 A1* | 11/2013 | Rennie | F23N 1/022 431/12 |
| 2014/0261111 A1* | 9/2014 | Cant | F23N 1/022 110/188 |
| 2015/0113998 A1* | 4/2015 | Tatsumi | F02C 9/34 60/776 |
| 2016/0076767 A1* | 3/2016 | Super | F23N 1/002 431/76 |
| 2017/0254536 A1* | 9/2017 | Super | F23N 1/022 |

FOREIGN PATENT DOCUMENTS

| | | | | |
|---|---|---|---|---|
| CN | 101432572 A | 5/2009 | ............ | F23B 20/06 |
| CN | 202904382 U | 4/2013 | ............ | F23B 80/02 |
| CN | 104718438 A | 6/2015 | ............ | G01F 1/42 |
| DE | 3703934 A1 | 8/1987 | ............ | F23N 1/02 |
| DE | 4337703 C1 | 3/1995 | ............ | F23N 1/02 |
| DE | 19501749 A1 | 7/1996 | ............ | F23D 14/60 |
| DE | 102004055715 B4 | 1/2006 | ............ | F23D 14/60 |
| DE | 102010010952 A1 | 9/2011 | ............ | F23D 14/60 |
| EP | 1243857 A1 | 9/2002 | ............ | F04D 29/42 |
| EP | 1236957 B1 | 11/2006 | ............ | F23L 17/00 |
| EP | 2556303 B1 | 2/2016 | ............ | F23N 1/02 |
| FR | 2 723 630 | 2/1996 | ............ | F23N 5/18 |
| FR | 2723630 | 2/1996 | ............ | F23N 1/02 |
| GB | 1571906 A | 7/1980 | ............ | F23N 1/02 |
| JP | 3031856 B2 | 4/2000 | ............ | F23N 1/02 |
| RU | 2067259 C1 | 9/1996 | ............ | F23N 5/08 |
| RU | 2141604 C1 | 11/1999 | ............ | F23N 5/00 |
| RU | 2169311 C1 | 6/2001 | ............ | F23C 15/00 |
| RU | 2349838 C2 | 3/2009 | ............ | F23N 1/02 |
| WO | 2014/045104 A1 | 3/2014 | ............ | G01F 1/42 |

OTHER PUBLICATIONS

Russian Office Action, Application No. 2017133736/06, 6 pages, dated May 22, 2018.
Russian Office Action, Application No. 2017133736/06, 12 pages, dated Sep. 27, 2018.
Chinese Office Action, Application No. 201710914124.4, 5 pages dated Apr. 24, 2019.
Chinese Office Action, Application No. 201710914081.X, 5 pages dated Oct. 26, 2018.

* cited by examiner

COMBUSTION DEVICE WITH A SIDE DUCT FOR MEASURING TURBULENT FLOWS

CROSS-REFERENCE TO RELATED APPLICATIONS

This application claims priority to EP Application No. 16191977.4 filed Sep. 30, 2016 and EP Application No. 17174747.0 filed Jun. 7, 2017, the contents of which are hereby incorporated by reference in their entirety.

TECHNICAL FIELD

The present disclosure deals with the measurement of flows of a fluid in a combustion device. In particular embodiments, the teachings may be employed in the measurement of flows of fluids such as air in the presence of turbulence.

BACKGROUND

Changes of air temperature and air pressure cause air temperature and air pressure-dependent fluctuations of the air/fuel ratio λ to occur. Combustion devices are therefore typically set with an air surplus to avoid unhygienic combustion. Setting combustion devices to an air surplus, however, results in a lower efficiency of the system.

Typically, rotational speed sensors and air pressure switches are used for measuring the amount of air. Rotational speed sensors are not sensitive to fluctuations in air temperature and air pressure. Air pressure switches are optimized for a specific pressure, so often a number of switches are used to monitor across a number of pressures. Despite this, adjusting the entire operating range of the combustion device is typically ineffective. Known solutions for adjustment require two units. The occurrence of turbulence makes the problem even more difficult, since the signal of a flow sensor is greatly influenced by its installed position in the middle of a turbulent flow. As well as this, the turbulence causes the measurement signal to be very noisy.

For example, European patent EP1236957B1 describes adaptation of a burner-operated heating device to an air exhaust system, including a pressure sensor/air mass sensor 28 arranged in the air feed 14 or exhaust gas venting system of a heating device. A regulating device 30 regulates a fan 26, starting from the signal of the sensor 28. To adapt the instantaneous air volume flow to a required air volume flow, an operating characteristic curve 40 is stored. To improve the regulation behavior with large differences in temperature and with respect to emergency operating characteristics a temperature sensor 35 is provided.

Other known systems include a pneumatic composite having mass balancing, a venturi nozzle which creates a vacuum, and a mass flow sensor in an additional duct. An open-loop or closed-loop controller regulates the speed of a fan as a function of the signal of the sensor.

SUMMARY

The teachings of the present disclosure may be employed to improve the flow measurement in combustion devices, especially in the presence of turbulence. For example, a combustion device may include: a burner (1), a side duct (28), and a feed duct (11) with a connector (12) for the side duct (28), with at least one inlet (27) and one outlet, wherein the at least one inlet (27) of the feed duct (11) is embodied to let a fluid flow into the feed duct (11), wherein the outlet of the feed duct (11) is embodied to let the fluid flow out of the feed duct (11) into the burner (1) of the combustion device. The side duct (28) comprises a mass flow sensor (13), an inlet, an outlet and at least one flow resistance element (14), wherein the inlet of the side duct (28) is connected to the connector (12) of the feed duct (11) so that the side duct (28) and the feed duct (11) have a fluid connection to one another. The mass flow sensor (13) is embodied to detect a signal according to a mass flow (15) of the fluid through the side duct (28), wherein the at least one flow resistance element (14) subdivides the side duct into a first section facing away from the mass flow sensor (13) and a second section facing towards the mass flow sensor (13) and has an admittance surface for the passage of the fluid between the first and the second section. The mass flow sensor (13) projects into the side duct (28) and the connector (12) of the feed duct (11) comprises a Pitot probe. The Pitot probe comprises a first section with at least one inlet opening (31) and a second section with an outlet, and the first and the second section of the Pitot probe have a fluid connection to one another. The first section of the Pitot probe projects into the feed duct (11) and the at least one inlet (31) of the Pitot probe is embodied to let the fluid flow in out of the feed duct (11) into the Pitot probe. The first section of the Pitot probe comprises a sub area facing towards the at least one inlet (27) of the feed duct (11) and a sub area facing towards that outlet of the feed duct (11). The sub area facing towards that outlet of the feed duct of the first section of the Pitot probe comprises the at least one inlet (31) of the Pitot probe.

In some embodiments, the outlet of the Pitot probe is embodied to let the fluid flow out of the Pitot probe into the side duct (28), wherein the at least one inlet (31) of the Pitot probe has an admittance surface for the passage of the fluid between feed duct (11) and the first section of the Pitot probe.

In some embodiments, the at least one inlet opening (31) of the Pitot probe has a number of openings each for the passage of the fluid between feed duct (11) and the first section of the Pitot probe and the diameter of each individual opening is dimensioned so that suspended particles in a mass flow (5) in the feed duct (11) do not get into the second section of the Pitot probe.

In some embodiments, the side duct (28) additionally has a bypass duct (29) and has at least one second flow resistance element (19). The at least one second flow resistance element (19) subdivides the side duct into a third section facing towards the at least one flow resistance element (14) and a fourth section facing away from the at least one flow resistance element (14). The bypass duct (29) branches off from the section of the side duct (28) so that the bypass duct (29) has a fluid connection to the third section.

In some embodiments, the bypass duct (29) has a third flow resistance element (20) and the third flow resistance element (20) is arranged in the bypass duct (29).

In some embodiments, the sub area of the first section of the Pitot probe facing towards that at least one inlet (27) of the feed duct (11) is closed off so that the sub area of the first section facing towards that at least one inlet (27) of the feed duct (11) blocks for a flow of the fluid from the feed duct (11) into the Pitot probe.

In some embodiments, the side duct (28) additionally comprises an outlet, which is embodied to let a fluid flow out of the side duct (28).

In some embodiments, the combustion device additionally comprises a combustion chamber (2), which is connected to the burner (1) and the outlet of the side duct (28) has a fluid connection to the combustion chamber (2) of the combustion device.

In some embodiments, the combustion device has a combustion chamber (2), which is connected to the burner (1), and comprises an environment, which surrounds the burner (1) and the combustion chamber (2) from the outside, wherein the outlet of the side duct (28) has a fluid connection to the environment of the combustion device.

In some embodiments, the outlet of the side duct (28) has a fluid connection to the feed duct (11).

In some embodiments, the outlet of the side duct (28) is additionally embodied to let a fluid flow into the side duct (28) and the inlet of the side duct (28) is additionally embodied to let a fluid flow out of the side duct (28).

In some embodiments, combustion device additionally comprises a signal-processing device, which comprises a lowpass filter, which is connected to the mass flow sensor (13), wherein the lowpass filter is embodied to filter the signal of the mass flow sensor (13).

In some embodiments, the lowpass filter is of an adaptive design.

In some embodiments, the combustion device comprises a second side duct (28), wherein the second side duct (28) comprises a mass flow sensor (13) and an inlet. The inlet of the second side duct (28) is connected to a connection selected from either the connector (12) of the feed duct (11), or a further connector, which includes the feed duct (11). The second side duct (28) and the feed duct (11) have a fluid connection to one another. The mass flow sensor (13) of the second side duct (28) projects into the second side duct (28) and is embodied to detect a signal according to a mass flow (15) of the fluid through the second side duct (28).

In some embodiments, there is a fan (3) and a closed loop and/or open-loop control and/or monitoring device (16). The closed-loop and/or open-loop control and/or monitoring device (16) is connected to the mass flow sensor (13) of the at least one side duct (28) of the combustion device.

BRIEF DESCRIPTION OF THE FIGURES

Various details become accessible to the person skilled in the art on the basis of the following detailed description. The individual forms of embodiment are not restrictive in this description. The drawings, which are enclosed with the description, can be described as follows.

DETAILED DESCRIPTION

The present disclosure teaches methods and devices for measuring flows in combustion devices in the presence of turbulence. For this purpose, a side duct in the combustion device is connected to a feed and/or to an outlet for a gaseous fluid. The side duct is connected to the feed and/or outlet such that a fluid can flow from the feed or outlet into the side duct. Introduced into the side duct is at least one flow resistance element. Thus, the mass flow sensor in the side duct is insensitive to solid particles and/or droplets in the fluid. In addition, the flow resistance element reduces the turbulence of the flow at the mass flow sensor. For further reduction of the sensitivity to solid particles, droplets and/or turbulence the fluid connection between feed and/or outlet and side duct is designed as a Pitot tube.

Surprisingly it has emerged in trials that the Pitot probe performs well when it is aligned downstream. In other words, the openings of the Pitot probe point downstream. Thus, the flow flows past the Pitot probe. It will be sucked in backwards by this arrangement. The sensitivity to solid particles, droplets, and/or turbulence may be greatly improved with this measure.

The methods and the devices according to the teachings herein may allow the safety margin of the fuel/air ratio $\lambda$ for an unhygienic combustion to be dimensioned smaller. Such a safety margin is necessary as a result of the natural fluctuations of pressure and temperature over time. As a result of the reduced safety margin an overall improved level of efficiency of the combustion device is produced.

Further, in methods and/or devices for measuring flows in combustion devices, the opening of at least one flow resistance element is able to be adjusted via an actuator. In some embodiments, the actuator is supplied with energy for adjusting the flow resistance element via an (eight-wire) computer network cable with energy transmission integrated into the cable.

In some embodiments, methods and/or devices for measuring flows in combustion devices include a first and a second flow resistance element are used. A pressure divider is constructed on the basis of the first and the second flow resistance element. A side duct is arranged in the fluid connection to the section between the two flow resistance elements. Arranged in that side duct is the mass flow sensor.

In some embodiments, methods and/or devices for measuring flows in combustion devices, include at least one opening of the side duct has a fluid connection to the environment of the combustion device, so that there is a fluid path between the feed and/or outlet and the environment (area outside the combustion device).

In some embodiments, methods and/or devices for measuring flows in combustion devices include a Pitot tube with a first and a second chamber. The first chamber has a fluid connection to the feed and/or outlet. The first and the second chamber have a fluid connection to each other and to the side duct. The side duct narrows the flow cross-section at this point. The mass flow sensor is located in the side duct. Preferably the second chamber also has a fluid connection to the feed and/or outlet.

In some embodiments, methods and/or devices for measuring flows in combustion devices include a mass flow sensor with an anemometer and a reference temperature sensor, wherein the anemometer is operated with constant power and/or with constant voltage and/or with constant current.

In some embodiments, the mass flow sensor comprises an anemometer and a reference temperature sensor, wherein the anemometer is operated with a constant temperature.

In some embodiments, the noise in the signal of the mass flow sensor generated by turbulence is filtered on the basis of a (electronic, digital) circuit. In some embodiments, filtering is done on the basis of a moving average value filter and/or on the basis of a filter with a finite pulse response and/or on the basis of a filter with an infinite pulse response and/or on the basis of a Chebyshev filter.

In some embodiments, the method and/or the device meet safety requirements. To this end the mass flow sensor is preferably designed with (dual) redundancy. Especially preferably the results of the two channels will be compared with one another in respect of checking the plausibility of the signals. Furthermore there is provision to check the signals of each individual sensor for plausibility (on the basis of an evaluation circuit). Ideally the evaluation circuit also checks itself for error-free functioning. To this end the evaluation circuit can preferably be designed with (dual) redundancy with result comparison and/or can generate test signals for function testing of the evaluation circuit.

In some embodiments, the mass flow sensor is supplied with energy on the basis of an (eight-wire) computer network cable with energy transmission integrated into the cable, e.g., measuring flows with a data transmission (and energy supply) by a two-wire, bidirectional bus, e.g. a CAN bus.

Figure 1:
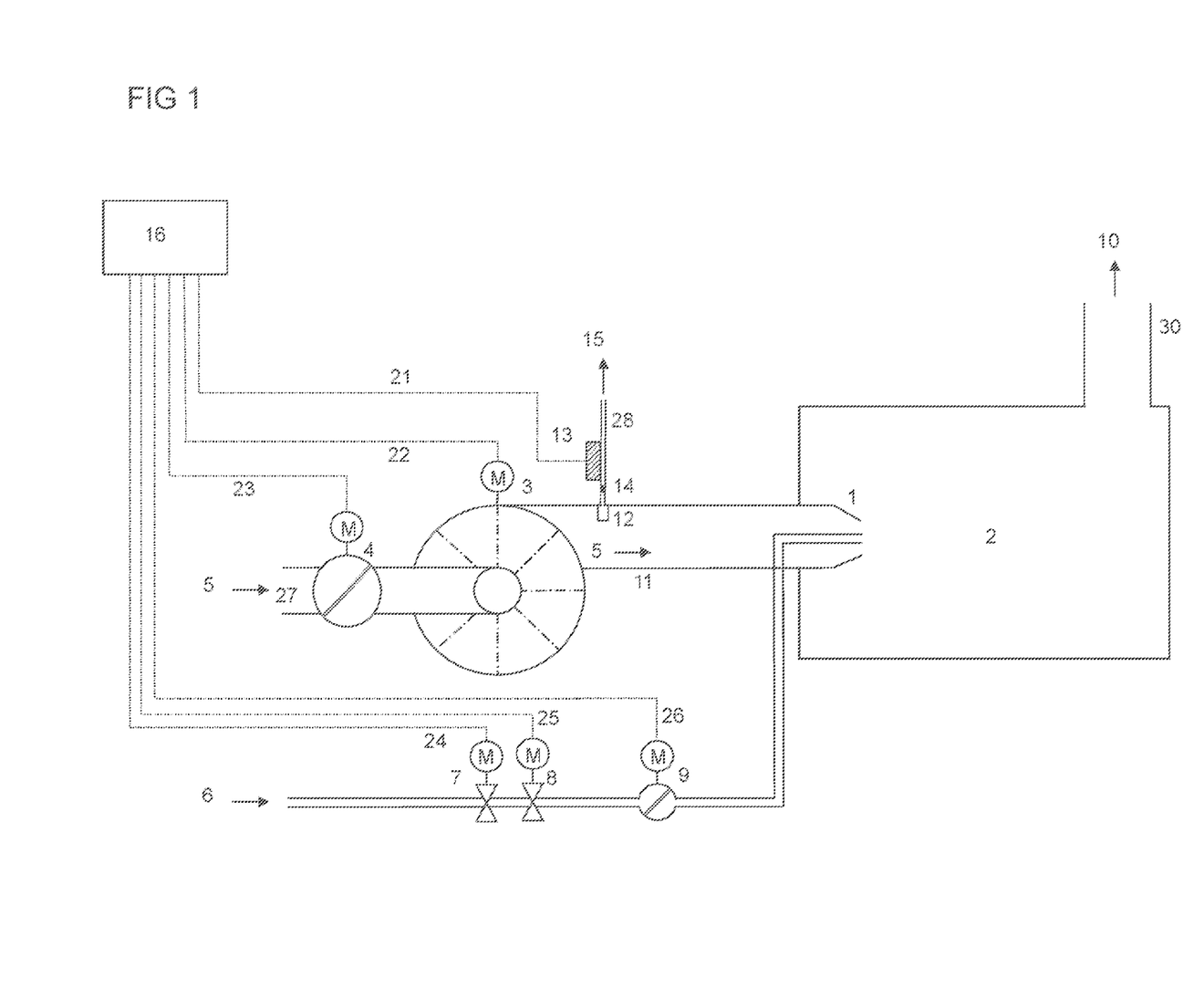
FIG. 1 shows a schematic of a system with a combustion device, wherein the flow of a fluid in an air feed is measured.

FIG. 1 shows a system comprising a burner 1, a heat consumer 2, a fan 3 with a speed that can be set and a flap 4 with motorized adjustment. The flap 4 with motorized adjustment is arranged after the air entry 27. The heat consumer 2 (heat exchanger) can be a hot water vessel for example. The throughflow (particle flow and/or mass flow) 5 of the fluid air can be set in accordance with FIG. 1 both by the flap 4 with motorized adjustment and also by specifying the rotational speed 22 of the fan. In the absence of the flap 4 the air throughflow 5 can also be adjusted just by setting the speed of the fan 3. Pulse width modulation comes into consideration for adjusting the speed of the fan 3 for example.

In some embodiments, the motor of the fan 3 is connected to a converter. The speed of the fan 3 is thus adjusted via the frequency of the converter. In some embodiments, the fan runs at a fixed, invariable speed. The air throughflow 5 is then defined by the position of the flap 4. In addition, further actuators are possible, which change the air throughflow 5. In such cases an adjustment of the burner nozzle or an adjustable flap in the waste gas vent duct can be involved.

In some embodiments, the throughflow 6 (for example particle flow and/or mass flow) of the fluid fuel is set by a fuel flap 9. In accordance with one form of embodiment the fuel flap 9 is a valve (with motorized adjustment).

Combustible gases such as natural gas and/or propane gas and/or hydrogen may be used as fuel. A liquid fuel such as heating oil may be used in some embodiments. In this case, the flap 9 may be replaced by an oil pressure regulator with motorized adjustment in the return of the oil nozzle. The safety shutdown function and/or closing function are implemented by the redundant safety valves 7-8. In accordance with a specific form of embodiment the safety valves 7-8 and the fuel flap 9 are realized as an integrated unit.

In some embodiments, the burner 1 is a combustion engine. In particular a combustion engine of a system with power-heat coupling comes into consideration. Fuel may be mixed into the flow of air 5 in and/or before the burner 1. The mixture is burned in the combustion chamber of the heat consumer 2. The heat is transported onwards in the heat consumer 2. For example, heated water is taken away via a pump to heating elements and/or in industrial firing systems an item is heated (directly). The exhaust gas flow 10 is vented via an exhaust gas path 30, for example a chimney.

In some embodiments, a closed-loop and/or open-loop control and/or monitoring device 16 coordinates all actuators so that the correct throughput 6 of fuel is set via the setting of the flap 9 for the corresponding air throughflow 5, which means the throughflow 5 of air (mass flow and/or particle flow) in duct 11 for each point of the burner power. Thus, the desired fuel/air ratio $\lambda$ is produced. In some embodiments, the closed-loop and/or open-loop control and/or monitoring device 16 is designed as a microcontroller.

In some embodiments, the closed-loop and/or open-loop control and/or monitoring device 16 sets the fan 3 via the signal 22 and the air flap 4 via the signal 23 to the values stored in the closed-loop and/or open-loop control and/or monitoring device 16 (in the form of a characteristic curve). In some embodiments, the closed-loop and/or open-loop control and/or monitoring device 16 comprises a (non-volatile) memory. Those values are stored in the memory. The setting of the fuel flap 9 is specified via the signal 26. In operation, the safety shut-off valves 7, 8 are set via the signals 24, 25.

If faults are to be uncovered in the flap 4, 9 and/or in the fan 3 (for example in the (electronic) interface or control device of the flap or of the fan), then this can be done by a safety-oriented feedback of the position of the flap 4 via the (bidirectional) signal line 23 for the flap 4 and/or via the (bidirectional) signal line 26 for the flap 9. A safety-oriented position message can be realized for example via redundant position generators. If a safety-oriented feedback about the rotational speed is required, this can be done via the (bidirectional) signal line 22 using (safety-oriented) rotational speed generators. In some embodiments, redundant rotational speed generators may be used for this purpose for example and/or the measured speed can be compared with required speed. The activation and feedback signals can be transferred via different signal lines and/or via a bidirectional bus In some embodiments, fitted before the burner is a side duct 28. A small amount of outflowing air 15 flows outwards through the side duct 28. In some embodiments, the air 15 flows out in this case into the space from which the fan 3 sucks in the air. In some embodiments, the outflowing air 15 flows out into the firing space of the heat consumer 2. In some embodiments, the air flows back into the air duct 11. In this case a flow resistance element is arranged (at least locally) in the air duct 11 between tapping off point and return. The side duct 28, together with the burner 1 and the waste gas path 30 of the heat consumer 2, form a flow divider. For a defined flow path through burner 1 and waste gas path 30, for a (reversibly unambiguous) value of the air flow 5 an associated value of an air flow 15 flows out through the side duct 28. The flow path through burner 1 and waste gas path 30 must only be defined in such cases for each point of the burner power. It can thus vary over the burner power (and thus over the air throughflow). In some embodiments, the side duct 28, depending on pressure conditions, can be both an outflow duct and also an inflow duct in relation to the air duct 11.

In some embodiments, a flow resistance element (in the form of a diaphragm) 14 is fitted in the side duct 28. With the flow resistance element 14 the amount of outflowing air 15 of the flow divider is defined. The function of the diaphragm 14 as a defined flow resistor can also be realized by a small tube of defined length (and diameter). The function of the diaphragm 14 can also be realized by using a laminar flow element or by another defined flow resistor.

In some embodiments, the admittance surface of the flow resistance element 14 can be adjusted by a motor. To avoid and/or remedy blockages caused by suspended particles, the admittance surface of the flow resistance element 14 can be adjusted. In particular, the flow resistance element 14 can be opened and/or closed. The admittance surface of the flow resistance element may be adjusted multiple times to avoid and/or to remedy blockages.

The amount of flow 15 in the side duct 28 depends on the admittance surface of the flow resistance element 14. Therefore, in some embodiments, the value of the air flow 5 is stored for each admittance surface of flow-resistance element 14 via characteristic values stored in the non-volatile memory. This enables the air flow 5 to be determined.

With this arrangement the throughflow 15 (particle flow and/or mass flow) through the side duct 28 is a measure for the air flow through the burner. In this case influences as a result of changes in the density of the air for example are compensated for by changes in the absolute pressure and/or the air temperature through the mass flow sensor 13. Normally the flow 15 is very much smaller than the air flow 5. Thus, the air flow 5 is (in practice) not influenced by the side duct 28. In some embodiments, the (particle and/or mass) flow 15 through the side duct 28 is smaller by at least a factor of 100, by at least a factor of 1000, and/or by at least a factor of 10000 than the (particle and/or mass) flow 5 through the air duct 11.

Figure 2:
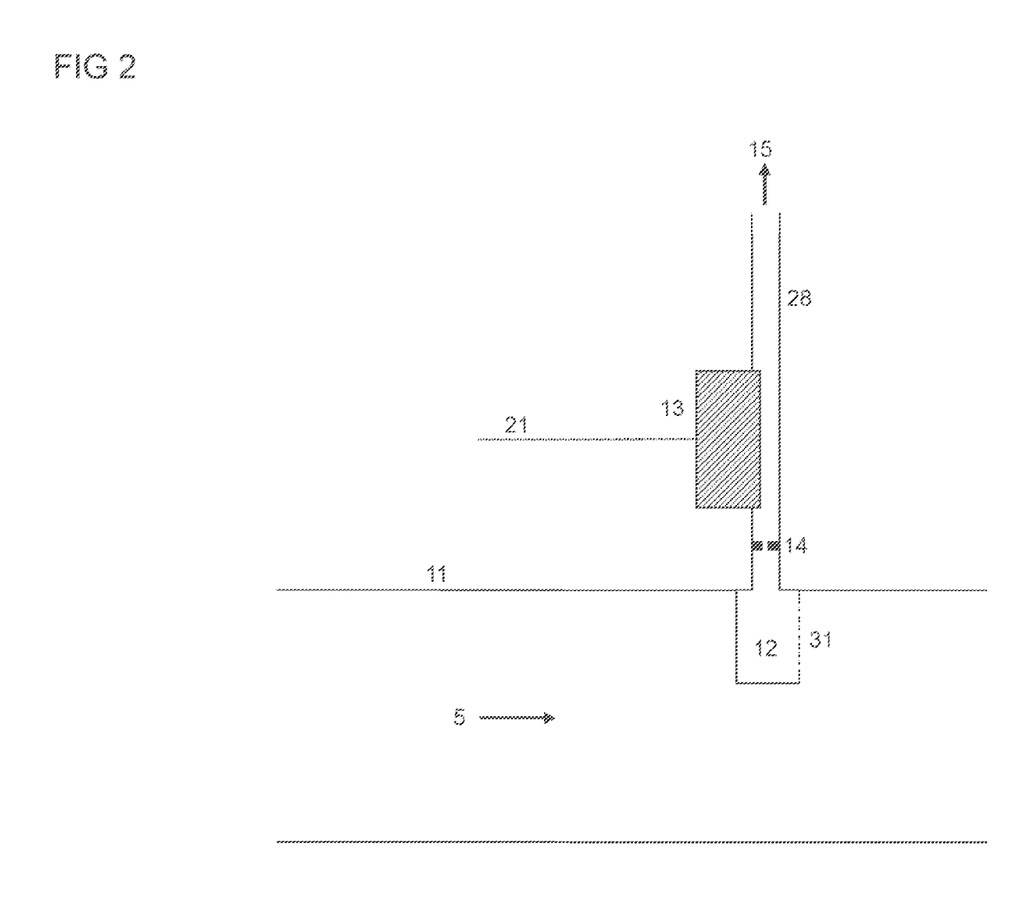
FIG. 2 shows the side duct in a detailed schematic.

FIG. 2 shows the section in the area of the side duct 28 in an enlarged view. The value of the flow 15 in side duct 28 is detected with the aid of a mass flow sensor 13. The signal of the sensor is transmitted via the signal line 21 to the closed-loop and/or open-loop control and/or monitoring device 16. In the closed-loop and/or open-loop control and/or monitoring device 16 the signal is mapped to a value of the flow 15 through the side duct 28 and/or of the air flow 5 through the air duct 11. In some embodiments, a signal-processing device is present at the location of the mass flow sensor 13. The signal-processing device has a suitable interface for transferring a signal processed (for a value of the air flow and/or flow 15) to the closed-loop and/or open-loop control and/or monitoring device 16.

Sensors such as the mass flow sensor 13 allow measurement at high flow speeds, specifically in conjunction with combustion devices in operation. Typical values of such flow speeds lie in ranges between typically 0.1 m/s and 5 m/s, 10 m/s, 15 m/s, 20 m/s, or even 100 m/s. Mass flow sensors, which are suitable for the present disclosure, are for example OMRON® D6F-W or SENSOR TECHNICS® WBA-type sensors. The usable range of these sensors typically begins at speeds between 0.01 m/s and 0.1 m/s and ends at a speed of for example 5 m/s, 10 m/s, 15 m/s, 20 m/s, or even 100 m/s. In other words, lower limits such as 0.1 m/s can be combined with upper limits such as 5 m/s, 10 m/s, 15 m/s, 20 m/s, or even 100 m/s.

Regardless of whether the signal processing is done in the closed-loop and/or open-loop control and/or monitoring device 16 or at the location of the mass flow sensor 13, the signal-processing device can contain a filter. The filter averages over fluctuations of the signal, which are caused by turbulences. A suitable filter for this purpose may include a moving average value filter, a filter with a finite pulse response, a filter with an infinite pulse response, a Chebyshev filter, etc. In some embodiments, the filter comprises a (programmable) electronic circuit.

In some embodiments, the (electronic) filter smoothes the measurement signal. In some embodiments, the filter can be of an adaptive design. To do this, the measurement signal is averaged over a long, maximum integration time (for example 2 seconds to 5 seconds) as a comparison value with a moving average value filter. If a measurement value deviates from the average value and/or from the required value outside a predetermined band, a jump in the required value is assumed. The measurement value is now used directly as the actual value. Thus the regulation circuit reacts immediately with the sample rate of the regulation circuit.

In some embodiments, a particular combination of Pitot probe 12, flow resistance element 14, and filter provides advantages. The filter allows frequency parts of the fluctuations of the signal of the mass flow sensor 13 to be compensated for, which are barely able to be compensated for via Pitot probe 12 and/or flow resistance element 14. In some embodiments, the Pitot probe 12 integrates pressure fluctuations of the mass flow 5 in the feed duct 11 of greater than 10 Hz, e.g., greater than 50 Hz. In some embodiments, the flow resistance element 14 damps pressure fluctuations of the mass flow 5 in the feed duct 11 by a factor of 5, by more than a factor of 10 or even by more than a factor of 40. Complementarily thereto the filter integrates fluctuations in the range of greater than 1 Hz, preferably greater than 10 Hz.

If the measurement values again lie within the defined band, the integration time is increased step-by-step with (each) sampling of the regulation circuit. The value integrated in this way is used as the actual value. This is done until the maximum integration time is reached. The regulation circuit will now be stationary. The value averaged in this way is now used as the actual value. The disclosed method makes possible an exact, stationary measurement signal at maximum dynamic.

In some embodiments, individual or all signal lines 21-26 comprise an (eight-wire) computer network cable with (or without) energy transmission integrated into the cable. In some embodiments, the units connected to the signal lines 21-26 communicate not only via the signal lines 21-26, but they are also supplied with energy for their operation via separate signal lines 21-26. Ideally power of up to 25.5 Watts can be transmitted through the signal lines 21-26. In some embodiments, the signals can also be transmitted via a two-wire, bidirectional bus, e.g. a CAN bus.

The form of measuring a flow in a side duct 28 illustrated in FIG. 2 may be appropriate for combustion devices. The air flow 5 in the air duct 11 between fan 3 and burner 1 is (in many cases) turbulent. The flow fluctuations resulting from turbulence in such cases lie in the same order of magnitude as the averaged value of the air flow 5. This means that a direct measurement of the value of the air flow 5 becomes significantly more difficult. The flow fluctuations occurring in the side duct 28 turn out to be much smaller than the flow fluctuations in the air duct 11 caused by the fan 3. Thus, with the arrangement shown in FIG. 2, a significantly improved signal-to-noise ratio of the signal of the mass flow sensor 13 is obtained. The side duct 28 may be constructed so that (practically) no relevant macroscopic flow profile of the flow 15 is obtained. In the side duct 28 the flow 15 may slide in a laminar manner over the mass flow sensor 13. The Reynolds number $Re_D$ may be used to divide the mass flow 15 of a fluid in the side duct 28 with diameter D into laminar or turbulent. In some embodiments, flows with Reynolds numbers $Re_D<4000$, with $Re_D<2300$, and/or with $Re_D<1000$, are treated as laminar.

In some embodiments, the admittance surface of the flow resistance element 14 is dimensioned to let a defined, e.g., laminar, flow profile (of a mass flow 15) arise in the side duct 28. A defined flow profile (of the mass flow 15 of a fluid) in the side duct 28 is characterized by a defined velocity distribution of a mass flow 15 as a function of the radius of the side duct 28. The mass flow 15 thus does not run chaotically. A defined flow profile is unique for each flow amount 15 in the side duct 28. With a defined flow profile, the flow value measured locally at the mass flow (sensor) is representative for the flow amount in the side duct 28. It is thus representative for the air flow 5 in the feed duct 11. A defined flow profile in the side duct 28 (of a mass flow 15)

is preferably not turbulent. In some embodiments, a defined flow profile (of a mass flow 15) in the side duct 28 can have a (parabolic) speed distribution as a function of the radius of the side duct 28.

In the arrangement in accordance with FIG. 2 however an indirect pressure measurement is involved. By contrast with a pressure measurement, changes in the mass flow as a result of a temperature change are detected as well. The device disclosed here is also capable of compensating for temperature changes with the aid of the closed-loop and/or open-loop control and/or monitoring device 16. The mass flow sensor 13 is easy to install on practically any system on the pressure side.

In some embodiments, to reduce the influence of turbulences even further, the flow 15 can be directed over the Pitot probe 12 in the side duct 28. The Pitot probe 12 is arranged in the air duct 11. The Pitot probe 12 may comprise a tube with any given cross section (for example round, angular, triangular, trapezoidal, preferably round). The end of the tube 12 in the direction of the main air flow 5 may be closed or greatly narrowed. The end of the tube, which projects out of the tube with the main flow 5, forms the beginning of the side duct 28. That end opens out into the side duct 28.

Laterally on the side of the Pitot probe 12 in the direction from which the air flow 5 comes are a number of inlet openings (for example slots or holes) 31. Through the opening 31 a fluid, such as for example air from the air duct 11 can enter into the Pitot probe 12. Thus the Pitot probe 12 has a (direct) fluid connection via the openings 31 with the air duct 11. The total surface of the openings 31 (the cross section of the openings 31 through which fluid can flow) is far greater than the admittance surface of the flow resistance element 14. Thus the admittance surface of the flow resistance element 14 is (in practice) determining for the value of the air flow 15 through the side duct 28. In accordance with a specific form of embodiment the total cross section of the openings 31 through which fluid can flow is greater at least by a factor of 2, preferably at least by a factor of 10, especially preferably at least by a factor of 20, than the admittance surface of the flow resistance element 14.

The total surface of the openings 31 may be small when compared to the cross-section of the Pitot probe 12. This means that fluctuations of the turbulent main flow 5 have (in practice) no effect. In the tube of the Pitot probe a calmed constriction pressure is established. In some embodiments, the total cross-section of the openings 31 through which fluid can flow is smaller at least by a factor of 2, at least by a factor of 5, and/or at least by a factor of 10, than the cross-section of the Pitot probe 12.

In some embodiments, suspended particles and/or droplets are very unlikely to get into the side duct 28. Through the significantly lower speeds of the air in the side duct 28 and through the constriction pressure in the Pitot probe 12 suspended particles and/or droplets will continue to be swirled in the turbulent main flow 5. Larger solid particles can barely get into the Pitot probe 12 because of the constriction pressure and because of the openings 31. They will be swirled past the Pitot probe 12. To this end the individual openings of the inlet 31 have diameters of less than 5 mm, of less than 3 mm, of less than 1.5 mm.

In some embodiments, the openings 31 along the Pitot probe 12 are dimensioned so that the average value of the constriction pressure is formed over a macroscopic flow profile of the air flow 5 in the Pitot probe 12. A Pitot probe 12 of defined length may smooth a macroscopic flow profile of the air flow 5 inside the tube and/or compensate for the respective flow conditions for different designs of air duct 11 via a length of the Pitot probe adapted to the air duct 11. Such compensation applies especially to air ducts with different diameters.

It has surprisingly turned out to be especially advantageous to align the openings 31 of the Pitot probe 12 in the downstream direction. The Pitot probe 12 subdivides the air duct 11 into a first and a second section. The first section of the air duct 11 is directed downstream away from said tube. The second section of the air duct 11 is directed upstream away from the Pitot probe 12. In this case the direction of the air flow defines upstream and downstream. In other words, upstream is against the direction of the air flow 5, downstream is in the direction of the air flow 5.

Contrary to a first assumption, according to which a Pitot probe 12 directed downstream would tend to let a fluid flow into the duct 11, this arrangement proves to be effective. The Pitot probe 12 aligned downstream sucks the flow in backwards. An additional factor is that with this arrangement the danger of the intrusion of particles into the Pitot probe 12 is significantly reduced.

Figure 3:
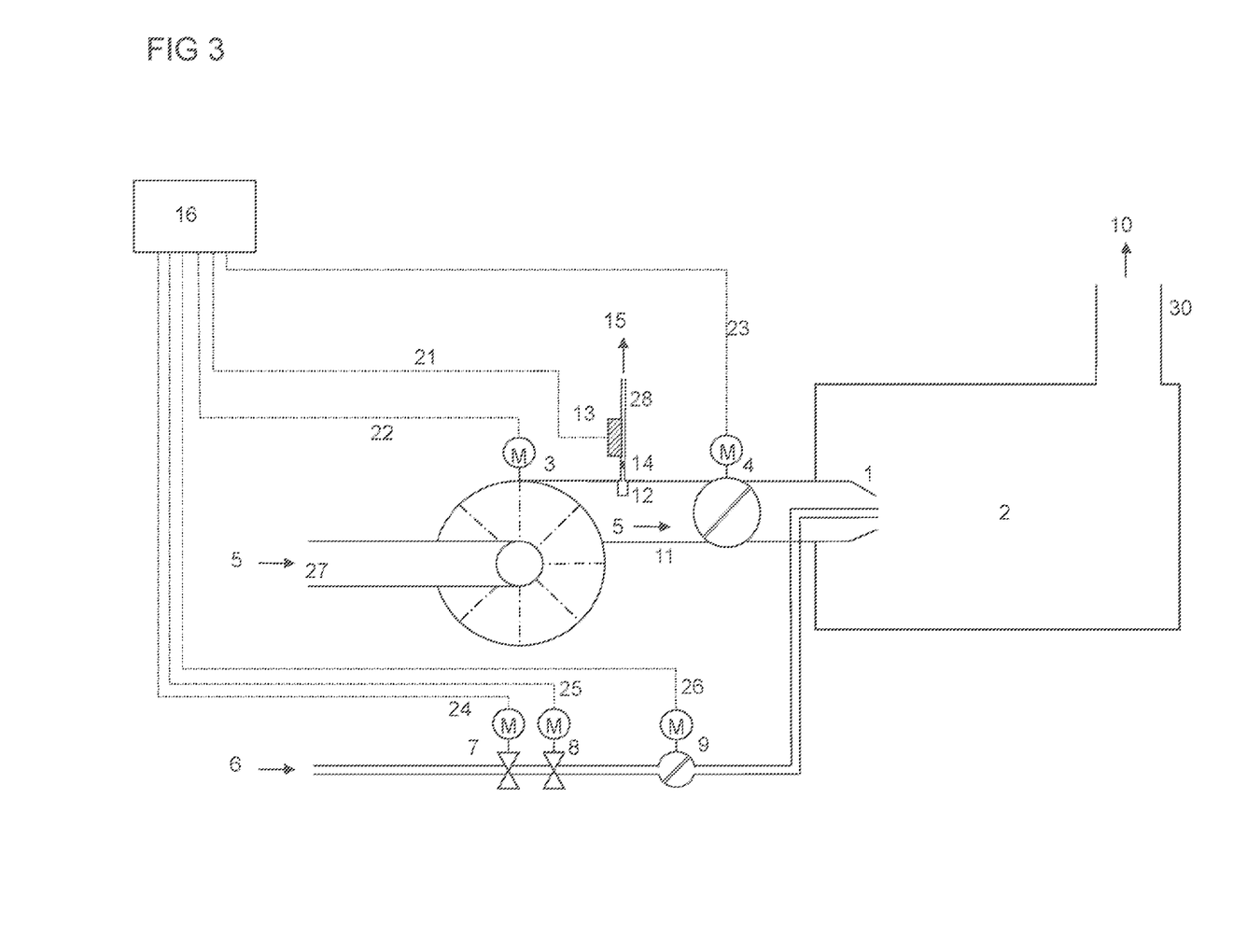
FIG. 3 shows a schematic of a system with a combustion device and with an air flap arranged on the pressure side.

As a modified form of embodiment compared to FIG. 1, FIG. 3 shows a system with an air flap 4 adjusted by a motor. The air flap 4 is arranged downstream of the fan 3. The air flap 4 is also arranged downstream of the side duct 28. The system for FIG. 3 allows the definition of a position of the air flap 4 and/or of the speed of the fan 3 for each point of the burner power. This produces from each value of air throughflow 5 and the (fed back) setting of the air flap 4 and/or the (fed back) speed of the fan 3, a flow value 15 in the side duct 28.

Figure 4:
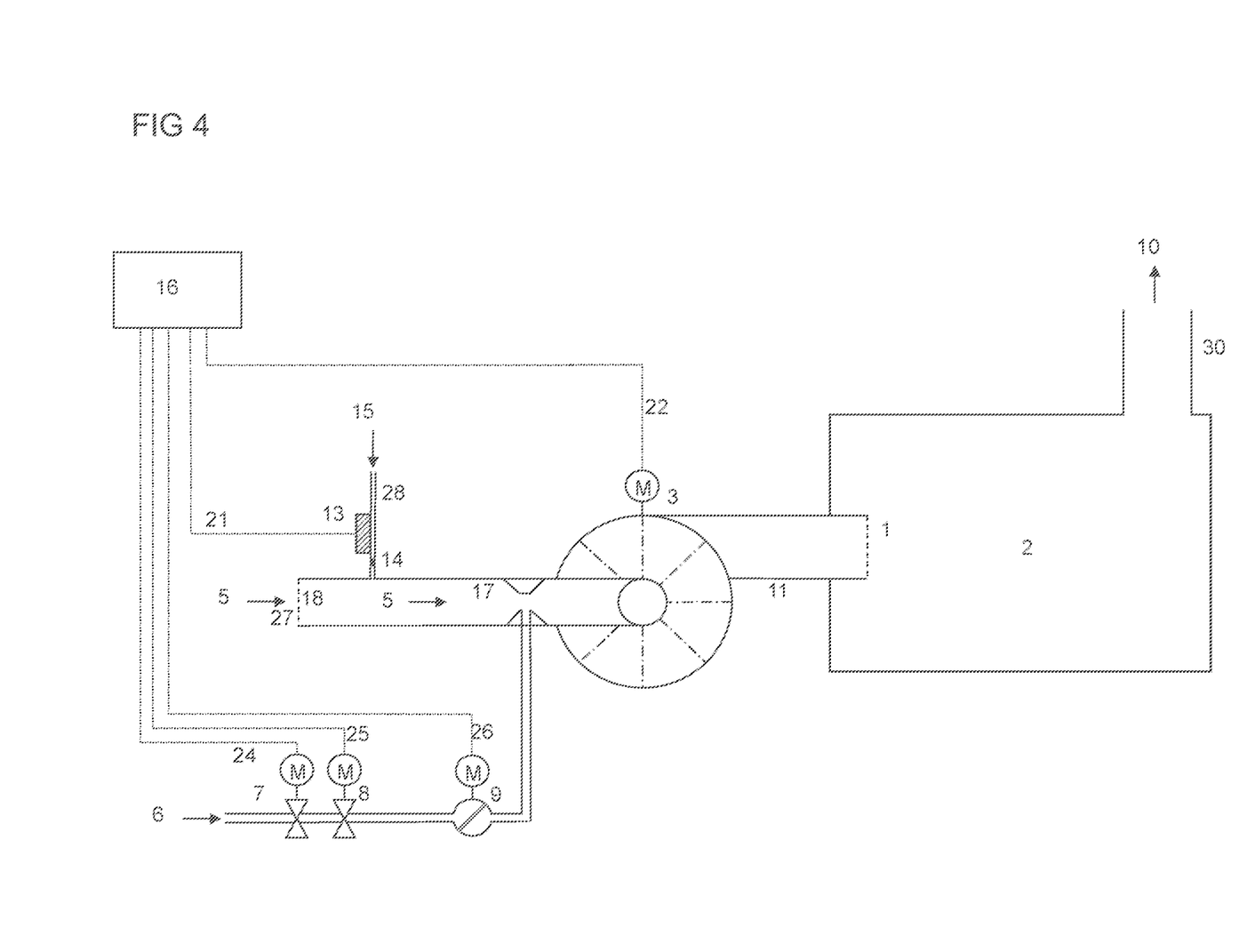
FIG. 4 shows a schematic of a system with a combustion device and with a mixing device before the fan.

As a modified form of embodiment compared to FIG. 1 and FIG. 3, FIG. 4 shows a system with a mixing device 17 before the fan 3. By contrast with the systems from FIG. 1 and from FIG. 3, fuel is not mixed with air at the burner 1. Instead fuel is mixed-in with the air flow 5 before the fan 3 using a mixing device 17. There is accordingly the fuel/air mixture in the fan 3 and in the duct 11. The fuel/air mixture is subsequently burned in the burner 1 in the firing space of the heat consumer 2.

By contrast with FIG. 1 and FIG. 3, the air 15 flows in on the suction side over the mass flow sensor 13. The fan 3 creates a vacuum at this location. In other words, the side duct 28 is an inflow duct. The side duct 28 may be arranged before the mixing device 17. This means that any possible vacuum generated by the mixing device 17 has no effect on the throughflow 15 (particle flow and/or mass flow) through the side duct 28.

Changes in the amount of gas as a result of adjustments of the fuel flap 9 with motorized adjustment do not influence the throughflow 15 through the side duct 28. The mixing device 17 (in practice) no longer has any effect in the area of the side duct 28. Should the vacuum in the feed of the fan 3 not suffice, then a defined flow-resistance element can be created with a flow resistance element 18 at the entry 27 of the fan feed. Together with the flow resistance element 14 in the side duct 28 a flow divider is realized.

In FIG. 4 the fluid flow 5 may be set via the fan 3 with the aid of the signal line 22. A flap with motorized adjustment can be installed in addition. Such a flap may be arranged on the pressure side or the suction side in relation to the fan 3. In some embodiments, the fan may replace the flow resistance element 18. It is then practically embodied as a flow resistance element with motorized adjustment (with feedback). The mass flow sensor 13 is simple to fit on the suction side of practically any system. The systems disclosed in FIG. 3 and FIG. 4 also compensate for changes in density of the air, as illustrated for FIG. 1. In each case the particle and/or mass flow 5 of the fluid through the burner 1 is established.

In some embodiments, the throughflow 15 in the side duct 28 is measured with a mass flow sensor 13. The mass flow sensor 13 may be arranged in the feed duct/outflow duct 28. The mass flow sensor may employ the anemometer principle. In this principle an (electrically) operated heater heats the fluid. The heating resistance can simultaneously be used as a temperature measurement resistance. The reference temperature of the fluid is measured in a measuring element before the heating resistance. The reference temperature measuring element can likewise be designed as a resistor, for example in the form of a PT-1000 element. In some embodiments, a heating resistor and a reference temperature resistor are arranged on one chip. In this case the heating must be sufficiently thermally decoupled from the reference temperature measurement element.

The anemometer can be operated in at least two ways. In some embodiments, the heating resistor is heated with a constant, known heating power, heating voltage and/or heating current. The difference temperature of the heater from the reference temperature measurement element is a measure for the throughflow (particle flow and/or mass flow) in the side duct 28. It is thus likewise a measure for the throughflow 5 (particle flow and/or mass flow) of the main flow.

In some embodiments, the heater is heated in a closed temperature-regulation circuit. A constant temperature of the heater is thus produced. The temperature of the heater is (apart from fluctuations through the regulation) equal to the temperature of the required value of the regulation circuit. The required value of the temperature of the heater is defined by a constant temperature difference being added to the measured temperature of the reference temperature measurement element. The constant temperature difference thus corresponds to the overtemperature of the heater in relation to the reference temperature measurement element. The power introduced into the heater is a measure for the throughflow (particle flow and/or mass flow) in the side duct 28. It is thus likewise a measure for the throughflow 5 (particle flow and/or mass flow) of the main flow.

Figure 5:
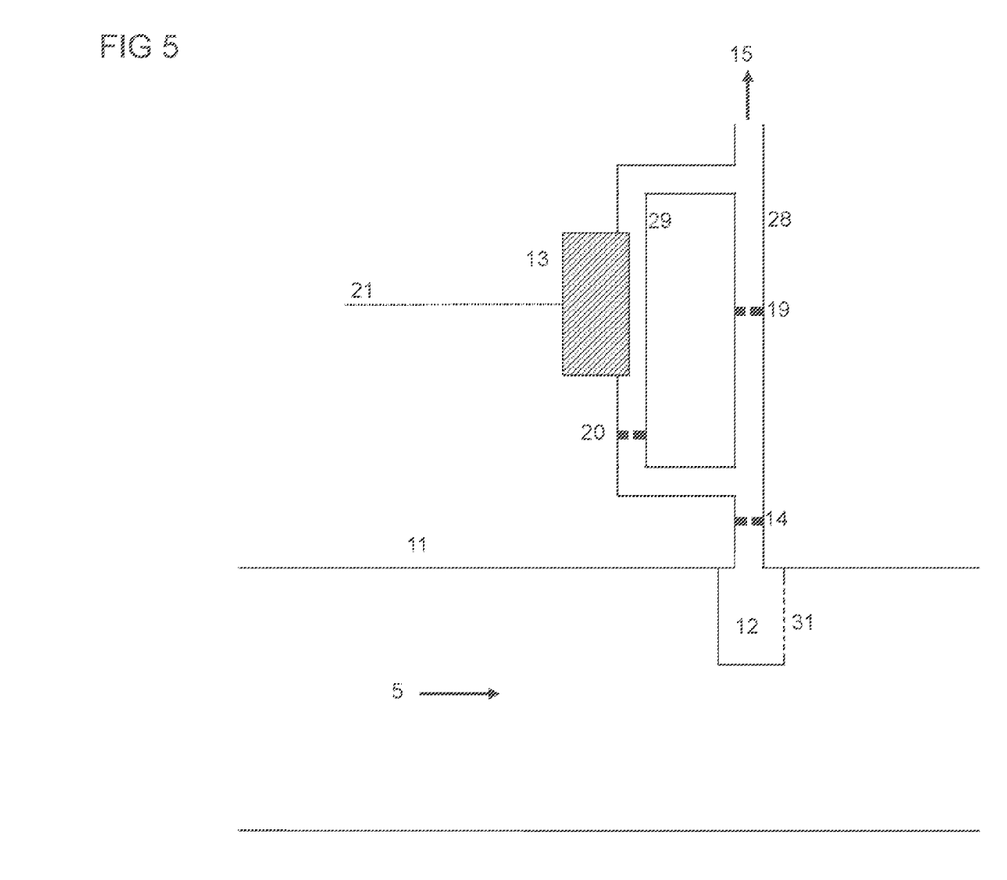
FIG. 5 shows a schematic of a side duct with bypass duct. The Pitot probe has openings that are directed downstream.

The measurement range of the flow sensor can in such cases under some circumstances correspond to a small flow 15 in the side duct 28. Consequently, with a sufficiently high fan pressure, the admittance surface of the flow resistance element 14, which determines the throughflow 15, must be designed small. With such small admittance surfaces the danger exists that the flow resistance element 14 will be blocked by suspended particles. FIG. 5 teaches how a pressure divider with bypass duct 29 can be constructed in such cases.

A second flow resistance element 19 with a larger admittance surface then lies behind the first flow resistance element 14. Thus the pressure is divided between the two flow resistance elements 14 and 19. The admittance surfaces of the flow resistance elements 14 and 19 determine the division of the pressure. Arranged before the mass flow sensor 13 in the bypass duct 29 is a further flow resistance element 20. The person skilled in the art selects the admittance surface of the flow resistance element 20 to be sufficiently large. The person skilled in the art also selects an admittance surface of the flow resistance element 20 adapted to the mass flow sensor 13. With the sub-flow divider constructed in this way the throughflow 5 (particle flow and/or mass flow) through duct 11 can then be deduced (reversibly unambiguously).

For a fault-tolerant version of the measurement process the mass flow sensor 13 may include (dual) redundancy with result comparison. The dual design initially involves the mass flow sensor itself as well as the signal-processing device. The result comparison can then be carried out in secure hardware and/or software at the location of the sensor and/or in the closed-loop and/or open-loop control and/or monitoring device 16. In accordance with a further form of embodiment the side duct 28 is realized with (dual) redundancy. Preferably each redundant side duct 28 present comprises a flow resistance element 14. This allows faults caused by blocked flow resistance elements 14 to be uncovered. The branch for the second side duct preferably lies in this case between flow resistance element 14 and Pitot probe 12. The Pitot probe 12 can be assumed to be fault-tolerant on account of the large openings 31.

Other faults such as formation of deposits on the mass flow sensor 13, scratches and/or other damage, which have an influence on the measurement signal, can be recognized. The (dual) redundant structure of the signal-processing device also enables faults in the signal-processing device to be recognized. In accordance with one form of embodiment the measurement values of the redundant mass flow sensors 13 present, preferably with formation of average values in each case, are compared with each other by subtraction. The difference $\Delta$ then lies within a threshold value band $$-\varepsilon_1 \leq \Delta \leq \varepsilon_2$$

with the limits $\varepsilon_1$ and $\varepsilon_2$. With the aid of a characteristic curve of the respective limit values $\varepsilon_1$ and $\varepsilon_2$ over the required value of the air flow 5, the difference $\Delta$ can then be compared and evaluated for each required value of the air flow 5.

In some embodiments, parts of a closed-loop control device or of a method may include hardware, software modules executed by a computer unit, or Cloud computers, or on the basis of a combination of the aforementioned options. The software might comprise firmware, a hardware driver which is executed within an operating system, and/or an application program. The present disclosure thus relates to a computer program product, which contains the features of this disclosure or carries out the required steps. In a realization as software the described functions can be stored as one or more commands on a computer-readable medium. A few examples of computer-readable media include random access memory (RAM), magnetic random access memory (MRAM), read only memory (ROM), flash memory, electronically programmable ROM (EPROM), electronically programmable and erasable ROM (EEPROM), registers of a computer unit, a hard disk, a removable storage unit, an optical memory, or any other suitable medium that can be accessed by a computer or by other IT devices and applications.

In some embodiments, the mass flow sensor 13 projects into the side duct 28. In some embodiments, the connector 12 of the feed duct 11 comprises a Pitot probe. In some embodiments, the Pitot probe comprises a first section with at least one inlet 31 and a second section with an outlet and there is a (direct) fluid connection between the first and the second section of the Pitot probe.

In some embodiments, the first section of the Pitot probe comprises a sub-area facing towards the at least one inlet 27 of the feed duct 11 and a sub-area facing towards the outlet of the feed duct 11. In some embodiments, the sub-area of the first section of the Pitot probe facing towards the outlet of the feed duct 11 comprises the at least one inlet 31 of the Pitot probe.

In some embodiments, the sub-area of the first section of the Pitot probe facing towards the at least one inlet 27 of the feed duct 11 is closed. Thus the fluid cannot flow into the Pitot probe through the sub-area of the first section of the Pitot probe facing towards the at least one inlet 27 of the feed duct 11. In other words the sub-area of the first section of the Pitot probe facing towards the at least one inlet (27) of the feed duct 11 is blocked for a flow of the fluid out of the feed duct 11 into the Pitot probe. The sub-area of the first section of the Pitot probe facing towards the at least one inlet 27 of the feed duct 11 in particular has no openings and/or is closed off.

In some embodiments, the mass flow sensor 13 projects at least 1 mm, at least 2 mm, or at least 5 mm into the side duct 28. In some embodiments, the first section of the Pitot probe projects at least 1 mm, at least 2 mm, or at least 5 mm into the feed duct 11. In some embodiments, the first and the second section of the Pitot probe have a direct fluid connection to one another. In some embodiments, the first section of the Pitot probe comprises precisely two sub-areas.

In some embodiments, the flow resistance element 14 is arranged between mass flow sensor 13 and inlet of the side duct 28.

In some embodiments, the admittance surface of the inlet 31 of the Pitot probe is larger than the admittance surface of the flow resistance element 14.

In some embodiments, the at least one inlet 31 of the Pitot probe has a number of openings in each case for the passage of the fluid between feed duct 11 and the first section of the Pitot probe. In some embodiments, the diameter of each individual opening is dimensioned so that suspended particles and/or droplets in a mass flow 5 in the feed duct 11 do not reach the second section of the Pitot probe.

In some embodiments, the mass flow sensor 13 comprises an anemometer, and wherein the anemometer of the mass flow sensor 13 is embodied to be operated at a constant temperature. In some embodiments, the mass flow sensor 13 comprises an anemometer, and wherein the anemometer of the mass flow sensor 13 is embodied to be operated at a constant power. In some embodiments, the mass flow sensor 13 comprises an anemometer, and wherein the anemometer of the mass flow sensor 13 is embodied to be operated at a constant voltage. In some embodiments, the mass flow sensor 13 comprises an anemometer, and wherein the anemometer of the mass flow sensor 13 is embodied to be operated at a constant current.

In some embodiments, the mass flow sensor 13 projects into the bypass duct 29. In some embodiments, the bypass duct 29 branches off from the fourth section of the side duct 28 so that the bypass duct 29 has a (direct) fluid connection to the fourth section. In some embodiments, the bypass duct 29 has a third flow resistance element 20 and the third flow resistance element 20 is arranged in the bypass duct 29. In some embodiments, the side duct 28 comprises an outlet that is embodied to let a fluid flow out of the side duct 28.

In some embodiments, the combustion device comprises a heat consumer 2, which is connected to the burner 1 and the outlet of the side duct 28 has a (direct) fluid connection to the heat consumer 2 of the combustion device. In some embodiments, the combustion device comprises a heat consumer 2 that is connected to the burner 1 and an environment which surrounds the burner 1 and the heat consumer 2 from the outside, wherein the outlet of the side duct 28 has a (direct) fluid connection to the environment of the combustion device.

In some embodiments, the outlet of the side duct 28 has a (direct) fluid connection to the feed duct 11. In some embodiments, the outlet of the side duct 28 is additionally embodied to let a fluid flow into the side duct 28 and the inlet of the side duct 28 is additionally embodied to let a fluid flow out of the side duct 28.

In some embodiments, the combustion device comprises a signal-processing device, which comprises a lowpass filter, which is connected to the mass flow sensor 13 (for communication), wherein the lowpass filter is embodied to filter the signal of the mass flow sensor 13 (adaptively). In some embodiments, the lowpass filter is designed as an adaptive filter. In some embodiments, the 3 dB threshold of the lowpass lies below 50 Hz, below 5 Hz, and/or below 1 Hz.

In some embodiments, at least one of the flow resistance elements is a diaphragm 14. In some embodiments, at least one of the flow resistance elements is a diaphragm 14 with (motorized) adjustment.

In some embodiments, the combustion devices comprises a fan 3, a burner 1, a heat consumer 2 connected to the burner 1, and a closed-loop and/or open-loop control and/or monitoring device 16, and comprising one of the aforementioned combustion devices, wherein the closed-loop and/or open-loop control and/or monitoring device 16 is connected to the (at least one) mass flow sensor 13 of the at least one side duct 28 of the combustion device (for communication).

In some embodiments, the closed-loop and/or open-loop control and/or monitoring device 16 comprises a signal-processing device, which is connected to the mass flow sensor 13 (for communication), wherein the lowpass filter is embodied to filter the signal of the mass flow sensor 13 (adaptively).

In some embodiments, the combustion device additionally comprises an environment, which surrounds the burner 1 (and the heat exchanger 2), and the fan 3 is embodied to suck in a fluid from the environment of the combustion device.

The aforementioned relates to individual forms of embodiment of the disclosure. Various changes to the forms of embodiment can be made without deviating from the underlying idea and without departing from the framework of this disclosure. The subject matter of the present disclosure is defined via its claims. A wide variety of changes can be made without departing from the scope of protection of the following claims.

REFERENCE CHARACTERS

1 Burner
2 Heat consumer (heat exchanger), in particular combustion chamber
3 Fan
4 Flap or valve (with motorized adjustment)
5 Fluid flow (mass flow) in main duct, air flow, air through-flow
6 Fluid flow of a combustible fluid, fuel throughput
7, 8 Safety valve
9 Flap or valve (with motorized adjustment)
10 Waste gas flow, exhaust gas flow
11 Feed duct (air duct)
12 Connector
13 Mass flow sensor
14 Flow resistance element (diaphragm)
15 Throughflow (flow, mass flow) in the side duct
16 Closed-loop and/or open-loop control and/or monitoring device
17 Mixing device
18, 19, 20 Flow resistance elements (diaphragms)
21-26 Signal lines 27 Air inlet
28 Side duct
29 Bypass duct
30 Waste gas duct
31 Openings of the Pitot probe

The invention claimed is:

1. A combustion device comprising:
a burner;
a side duct; and
a feed duct including an inlet and an outlet, wherein a fluid flows through the inlet into the feed duct and through the outlet into the burner;
wherein the side duct comprises a mass flow sensor, an inlet, an outlet, and a first flow resistance element;
a connector joining the inlet of the side duct to the feed duct;
wherein the mass flow sensor generates a signal corresponding to a mass flow of a fluid flow through the side duct;
wherein the first flow resistance element subdivides the side duct into a first section including the inlet of the side duct and a second section including the mass flow sensor and limits passage of the fluid from the first section to the second section;
wherein the mass flow sensor projects into the side duct; and
the connector comprises an interior, an inlet opening, and an outlet opening having a fluid connection to one another through the interior;
the inlet opening is disposed within the feed duct allowing;
the fluid flow out of the feed duct into the interior of the connector;
wherein the inlet opening faces the outlet of the feed duct.

2. The combustion device as claimed in claim 1, wherein:
the outlet opening lets the fluid flow out of the connector into the side duct; and
the inlet opening comprises an admittance surface for the passage of the fluid between the feed duct and the interior of the connector.

3. The combustion device as claimed in claim 2, wherein:
the inlet opening comprises a number of openings each for the passage of the fluid between feed duct and the interior of the connector; and
the diameter of each individual opening stops suspended particles in a mass flow in the feed duct from entering the interior the connector.

4. The combustion device in accordance with claim 1, wherein:
the side duct comprises a bypass duct and a second flow resistance element downstream of the first flow resistance element;
and
the bypass duct branches off from the side duct between the first flow resistance elements and the second flow resistance element.

5. The combustion device as claimed in claim 4, wherein the side duct includes a third flow resistance element arranged in the bypass duct.

6. The combustion device as claimed in claim 1, wherein a face of the connector facing the inlet of the feed duct comprises a solid barrier to a flow of the fluid from the feed duct into the connector.

7. The combustion device as claimed in claim 1, further comprising a combustion chamber connected to the burner; and
wherein the outlet of the side duct includes a fluid connection to the combustion chamber.

8. The combustion device as claimed in claim 1, further comprising:
a combustion chamber connected to the burner; and
an environment surrounding the burner and the combustion chamber from the outside;
wherein the outlet of the side duct includes a fluid connection to the environment.

9. The combustion device as claimed in claim 1, wherein the outlet of the side duct includes a fluid connection to the feed duct.

10. The combustion device as claimed in claim 1, further comprising a signal-processing device with a lowpass filter connected to the mass flow sensor;
wherein the lowpass filter filters the signal of the mass flow sensor.

11. The combustion device as claimed in claim 10, wherein the lowpass filter is of an adaptive design.

12. The combustion device as claimed in claim 1, wherein the side duct feeds fluid from the feed duct to a mass flow sensor projecting into the second side duct to detect a signal according to a mass flow of the fluid through the second side duct.

13. The combustion device as claimed in claim 1, further comprising:
a fan; and
a control and monitoring device connected to the mass flow sensor of the side duct.

* * * * *